United States Patent
Tiwari et al.

(10) Patent No.: US 10,194,481 B2
(45) Date of Patent: Jan. 29, 2019

(54) DEVICE AND METHOD OF HANDLING RADIO RESOURCE CONTROL CONNECTION

(71) Applicant: HTC Corporation, Taoyuan (TW)

(72) Inventors: Kundan Tiwari, Taoyuan (TW);
Te-Ming Chen, Taoyuan (TW);
Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 37 days.

(21) Appl. No.: 15/404,203

(22) Filed: Jan. 12, 2017

(65) Prior Publication Data

US 2017/0202047 A1 Jul. 13, 2017

Related U.S. Application Data

(60) Provisional application No. 62/291,472, filed on Feb. 4, 2016, provisional application No. 62/277,496, filed on Jan. 12, 2016.

(51) Int. Cl.
| | |
|---|---|
| *H04W 76/27* | (2018.01) |
| *H04W 76/25* | (2018.01) |
| *H04W 76/19* | (2018.01) |
| *H04W 76/18* | (2018.01) |
| *H04W 72/04* | (2009.01) |
| *H04W 48/20* | (2009.01) |

(52) U.S. Cl.
CPC ....... *H04W 76/25* (2018.02); *H04W 72/0406* (2013.01); *H04W 76/18* (2018.02);
(Continued)

(58) Field of Classification Search
CPC ..... H04W 76/10; H04W 76/11; H04W 76/15; H04W 76/18; H04W 76/19; H04W 76/20;
(Continued)

(56) References Cited

U.S. PATENT DOCUMENTS

2012/0207040 A1* 8/2012 Comsa .............. H04W 72/1215
370/252
2013/0260811 A1 10/2013 Rayavarapu
(Continued)

FOREIGN PATENT DOCUMENTS

EP 2645804 A1 10/2013

OTHER PUBLICATIONS

Search Report dated May 29, 2017 for EP application No. 17150997.9, pp. 1-6.
(Continued)

*Primary Examiner* — Ashley Shivers
(74) *Attorney, Agent, or Firm* — Winston Hsu

(57) ABSTRACT

A communication device for handling a RRC connection comprises a storage unit and a processing circuit. The processing circuit is configured to execute instructions stored in the storage unit. The instructions comprise transmitting a first resume request message with a first resume identity for requesting a resume of the RRC connection to a first cell of a network; receiving a resume reject message from the first cell of the network; determining the first resume identity and at least one radio resource corresponding to the first resume identity are valid and keeping the first resume identity and the at least one radio resource, if the resume reject message comprises an indicator; and determining the first resume identity and the least one radio resource are invalid and releasing the first resume identity and the at least one radio resource, if the resume reject message does not comprise the indicator.

18 Claims, 5 Drawing Sheets

(52) U.S. Cl.
CPC ........... *H04W 76/19* (2018.02); *H04W 76/27* (2018.02); *H04W 48/20* (2013.01)

(58) Field of Classification Search
CPC ..... H04W 76/25; H04W 76/27; H04W 76/30; H04W 76/34; H04W 76/36; H04W 76/38
See application file for complete search history.

(56) References Cited

U.S. PATENT DOCUMENTS

| | | | |
|---|---|---|---|
| 2013/0288679 A1* | 10/2013 | Yi | H04W 48/08 455/435.1 |
| 2014/0241234 A1 | 8/2014 | Zhu | |
| 2016/0345261 A1* | 11/2016 | Walldeen | H04W 48/02 |
| 2017/0202003 A1* | 7/2017 | Johansson | H04W 4/70 |

OTHER PUBLICATIONS

3GPP TS 25.331 V13.1.0, 3rd Generation Partnership Project; Technical Specification Group Radio Access Network; Radio Resource Control (RRC); Protocol specification (Release 13), Section 8.1.3.4, 8.1.3.9, 8.2.2.11, 8.5.2, 8.5.10.1, 8.5.10.3, 8.6.4.1, 10.2.36, 10.3.3.29, 10.3.3.31, Dec. 2015.
Office action dated Oct. 20, 2017 for the Taiwan application No. 106101042, filing date Jan. 12, 2017, p. 1-9.
3GPP TR 23.720 V1.2.0(Nov. 2015).
3GPP TS 36.331 V13.0.0 (Dec. 2015).

\* cited by examiner

DEVICE AND METHOD OF HANDLING RADIO RESOURCE CONTROL CONNECTION

CROSS REFERENCE TO RELATED APPLICATIONS

This application claims both the benefits of U.S. Provisional Application No. 62/277,496, filed on Jan. 12, 2016, and U.S. Provisional Application No. 62/291,472, filed on Feb. 4, 2016, which are incorporated herein by reference.

BACKGROUND OF THE INVENTION

1. Field of the Invention

The present invention relates to a communication device and a method used in a wireless communication system, and more particularly, to a communication device and a method of handling a radio resource control connection.

2. Description of the Prior Art

A long-term evolution (LTE) system provides high data rate, low latency, packet optimization, and improved system capacity and coverage. In the LTE system, a radio access network known as an evolved universal terrestrial radio access network (E-UTRAN) includes at least one evolved Node-B (eNB) for communicating with at least one user equipment (UE), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, increases peak data rate and throughput, and includes advanced techniques, such as carrier aggregation (CA), coordinated multipoint (CoMP) transmissions/reception, uplink (UL) multiple-input multiple-output (UL-MIMO), licensed-assisted access (LAA) using LTE, etc. For a UE and an eNB to communicate with each other in the LTE-A system, the UE and the eNB must support standards developed for the LTE-A system, such as the 3rd Generation Partnership Project (3GPP) Rel-10 standard or later versions.

The UE may transmit a message for resuming a radio resource control (RRC) connection to a network when the UE needs to transmit data, after the RRC connection is suspended by the network. However, the network may reject the resumption of the RRC connection performed by the UE. According to the prior art, it is unknown whether resources corresponding to the RRC connection are valid or not, when the network rejects the resumption of the RRC connection. It may cause the consumption of resources. On the other hand, the resumption of the RRC connection performed by the UE may be failed. According to the prior art, it is unknown how to handle the failure of the resumption.

Thus, how to handle the RRC connection is a problem to be solved.

SUMMARY OF THE INVENTION

The present invention therefore provides a communication device and a method for handling a radio resource control (RRC) connection to solve the abovementioned problem.

A communication device for handling a RRC connection comprises a storage unit for storing instructions and a processing circuit coupled to the storage unit. The processing circuit is configured to execute the instructions stored in the storage unit. The instructions comprise transmitting a first resume request message with a first resume identity for requesting a resume of the RRC connection to a first cell of a network; receiving a resume reject message from the first cell of the network; determining the first resume identity and at least one radio resource corresponding to the first resume identity are valid and keeping the first resume identity and the at least one radio resource, if the resume reject message comprises an indicator; and determining the first resume identity and the least one radio resource are invalid and releasing the first resume identity and the at least one radio resource, if the resume reject message does not comprise the indicator.

A network for handling a RRC connection comprises a storage unit for storing instructions and a processing circuit coupled to the storage unit. The processing circuit is configured to execute the instructions stored in the storage unit. The instructions comprise receiving a resume request message with a resume identity for requesting a resume of the RRC connection from a communication device via a cell of the network; transmitting a resume reject message comprising an indicator to the communication device via the cell, if the network determines that the resume identity and at least one radio resource corresponding to the resume identity are valid; and transmitting the resume reject message not comprising the indicator to the communication device via the cell, if the network determines that the resume identity and the at least one radio resource are invalid.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
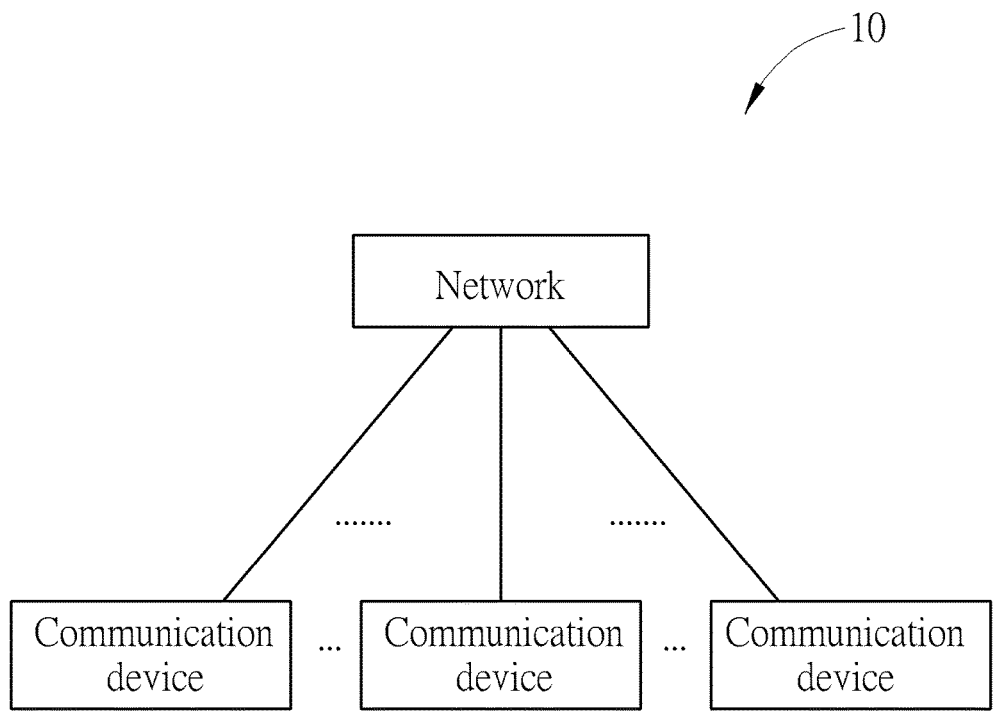
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. In FIG. 1, the network and the communication devices are simply utilized for illustrating the structure of the wireless communication system 10. Practically, the network may be a universal terrestrial radio access network (UTRAN) comprising at least one Node-B (NB) and/or a Radio Network Controller (RNC) in a universal mobile telecommunications system (UMTS). In one example, the network may be an evolved UTRAN (E-UTRAN) comprising at least one evolved NB (eNB) and/or at least one relay in a long term evolution (LTE) system, a LTE-Advanced (LTE-A) system or an evolution of the LTE-A system. In another example, the network may be a fifth generation (5G)

network including at least one 5G base station (BS) which employs orthogonal frequency-division multiplexing (OFDM) and/or non-OFDM, and transmission time interval smaller than 1 millisecond (ms) for communication with the communication devices. In general, a BS may also be used to refer any of the NB, the RNC, the eNB and the 5G BS.

Furthermore, the network may also include both the UTRAN/E-UTRAN and a core network, wherein the core network may include network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a communication device, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. In addition, the information may be processed by both the UTRAN/E-UTRAN and the core network, and the decisions are made after coordination and/or cooperation are performed by the UTRAN/E-UTRAN and the core network.

A communication device can be a user equipment (UE), a low cost device (e.g., machine type communication (MTC) device), a mobile phone, a laptop, a tablet computer, an electronic book, a portable computer system, a vehicle or aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
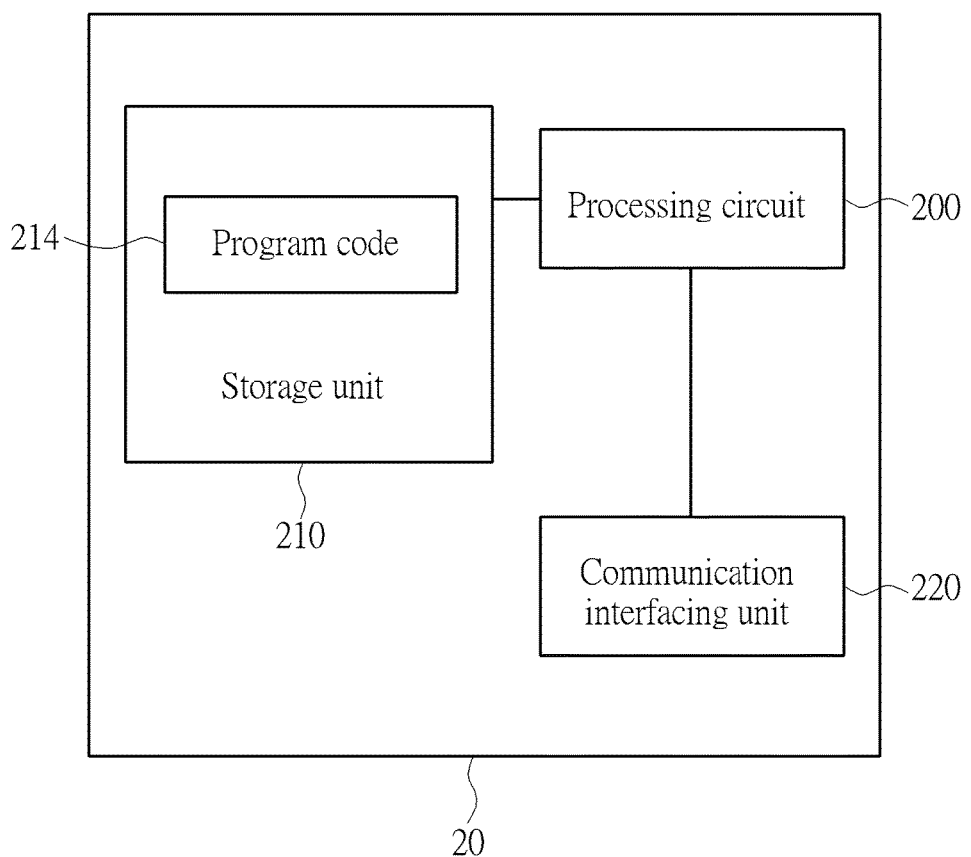
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing circuit 200 such as a microprocessor or Application Specific Integrated Circuit (ASIC), a storage unit 210 and a communication interfacing unit 220. The storage unit 210 may be any data storage device that may store a program code 214, accessed and executed by the processing circuit 200. Examples of the storage unit 210 include but are not limited to a subscriber identity module (SIM), read-only memory (ROM), flash memory, random-access memory (RAM), hard disk, optical data storage device, non-volatile storage unit, non-transitory computer-readable medium (e.g., tangible media), etc. The communication interfacing unit 220 is preferably a transceiver and is used to transmit and receive signals (e.g., data, signals, messages and/or packets) according to processing results of the processing circuit 200.

In the following embodiments, a UE is used to represent a communication device in FIG. 1, to simplify the illustration of the embodiments.

Figure 3:
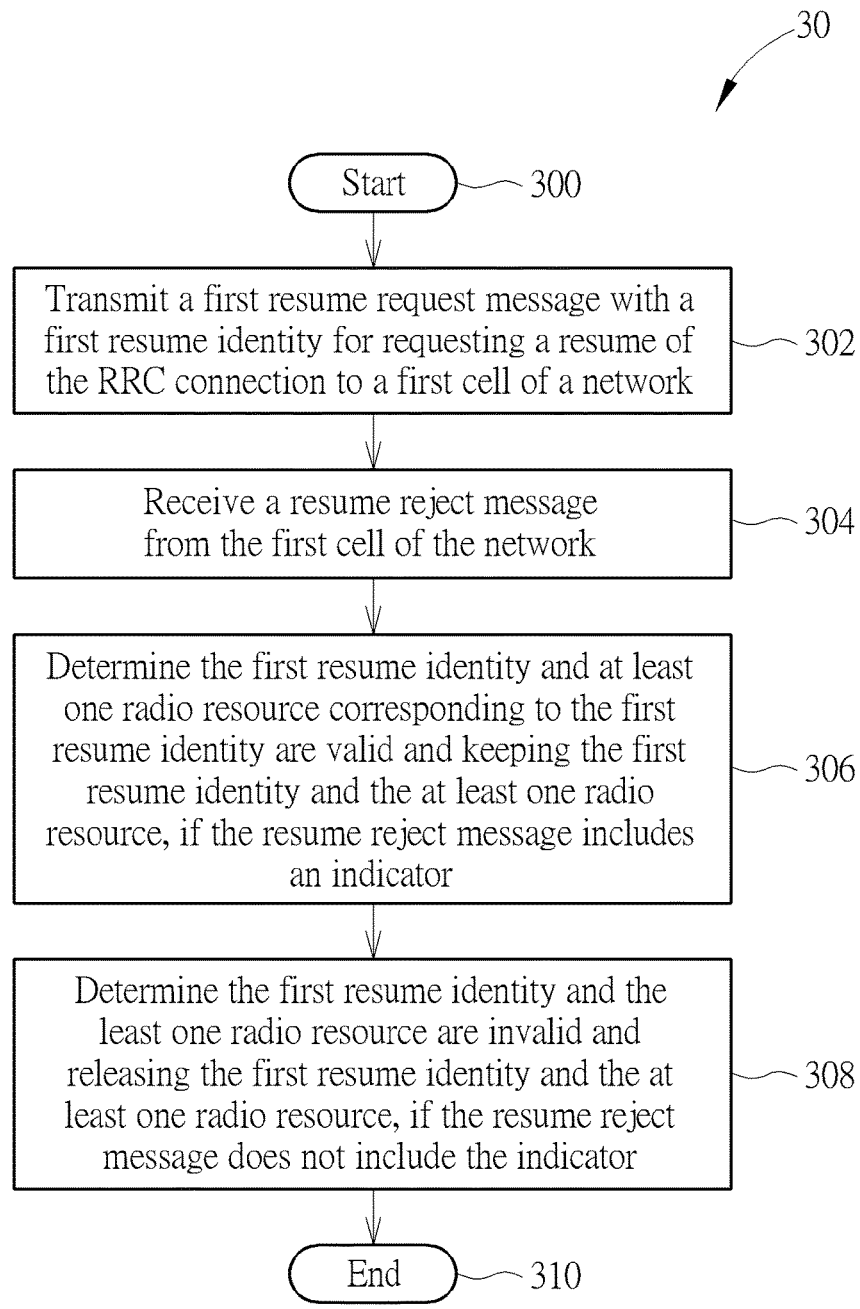
FIG. 3 is a flowchart of a process according to an example of the present invention.

FIG. 3 is a flowchart of a process 30 according to an example of the present invention. The process 30 may be utilized in a UE for handling a radio resource control (RRC) connection. The process 30 may be compiled into the program code 214, and includes the following steps:

Step 300: Start.

Step 302: Transmit a first resume request message with a first resume identity for requesting a resume of the RRC connection to a first cell of a network.

Step 304: Receive a resume reject message from the first cell of the network.

Step 306: Determine the first resume identity and at least one radio resource corresponding to the first resume identity are valid and keeping the first resume identity and the at least one radio resource, if the resume reject message includes an indicator.

Step 308: Determine the first resume identity and the least one radio resource are invalid and releasing the first resume identity and the at least one radio resource, if the resume reject message does not include the indicator.

Step 310: End.

According to the process 30, the UE may transmit a first resume request message with a first resume identity for requesting a resume of the RRC connection to a first cell of a network. The UE may receive a resume reject message from the first cell of the network. Then, the UE may determine the first resume identity and at least one radio resource corresponding to the first resume identity are valid and keeping the first resume identity and the at least one radio resource, if the resume reject message includes an indicator. The UE may determine the first resume identity and the least one radio resource are invalid and releasing the first resume identity and the at least one radio resource, if the resume reject message does not include the indicator. That is, the UE determine whether the first resume identity and the at least one radio resource are valid and whether to release the first resume identity and the at least one radio resource, according to whether the resume reject message includes the indicator. The at least one radio resource can be efficiently used according to the indicator. Thus, the problem of performing the RRC connection is solved according to the process 30.

Realization of the process 30 is not limited to the above description. The following examples may be applied to the process 30.

In one example, the UE may be a narrow band internet of things (NB-IoT) UE. In one example, the UE may be barred from accessing the first cell where the resume reject message is transmitted on. In one example, the first resume request message may include a RRCConnectionRequest message, a RRCConnectionReestablishmentRequest message, a RRCConnectionResumeRequest message, or a new message (e.g., a RRCResumeRequest message) for requesting the resume of the RRC connection. In one example, the resume reject message may include a RRCConnectionReject message, a RRCConnectionSetup message, a RRCConnectionReestablishmentReject message, a RRCConnectionReestablishment message, or a new message (e.g., a RRCResumeReject message) for rejecting the resume of the RRC connection.

In one example, the indicator may include redirection information. Further, the redirection information may include at least one of frequency information and a physical cell identity. In one example, after receiving the indicator including the redirection information from the first cell, the UE may select (or reselect) a second cell of the network on a first frequency of the first cell, if the redirection information does not include the frequency information. The UE may select (or reselect) the second cell on a second frequency indicated by the frequency information, if the redirection information includes the frequency information. In one example, the UE may transmit a second resume request message with the first or a second resume identity to the second cell. In one example, the UE may or may not transmit the second resume request message, when selecting (or reselecting) the second cell.

In one example, the indicator may include a timer with a timer value. Further, the UE may start the timer with the time value, after receiving the resume reject message which includes the indicator containing the timer. In one example, the UE may not resume the RRC connection to the first cell, before the timer expires. In one example, the UE may not initiate a RRC establishment procedure, before the timer expires, wherein the RRC establishment procedure is not for the resume of the RRC connection. In one example, the UE may transmit a third resume request message for requesting the resume of the RRC connection to the first cell of the network, after the timer expires. In one example, the UE may or may not transmit the third resume request message, when selecting (or reselecting) a third cell, before the timer expires. That is, the UE has to wait a period of time (e.g., the time value) to request the resume of the RRC connection, when receiving the indicator including the timer.

In one example of the process 30, "releasing" can be explained as "removing" or "deleting", but is not limited herein.

Figure 4:
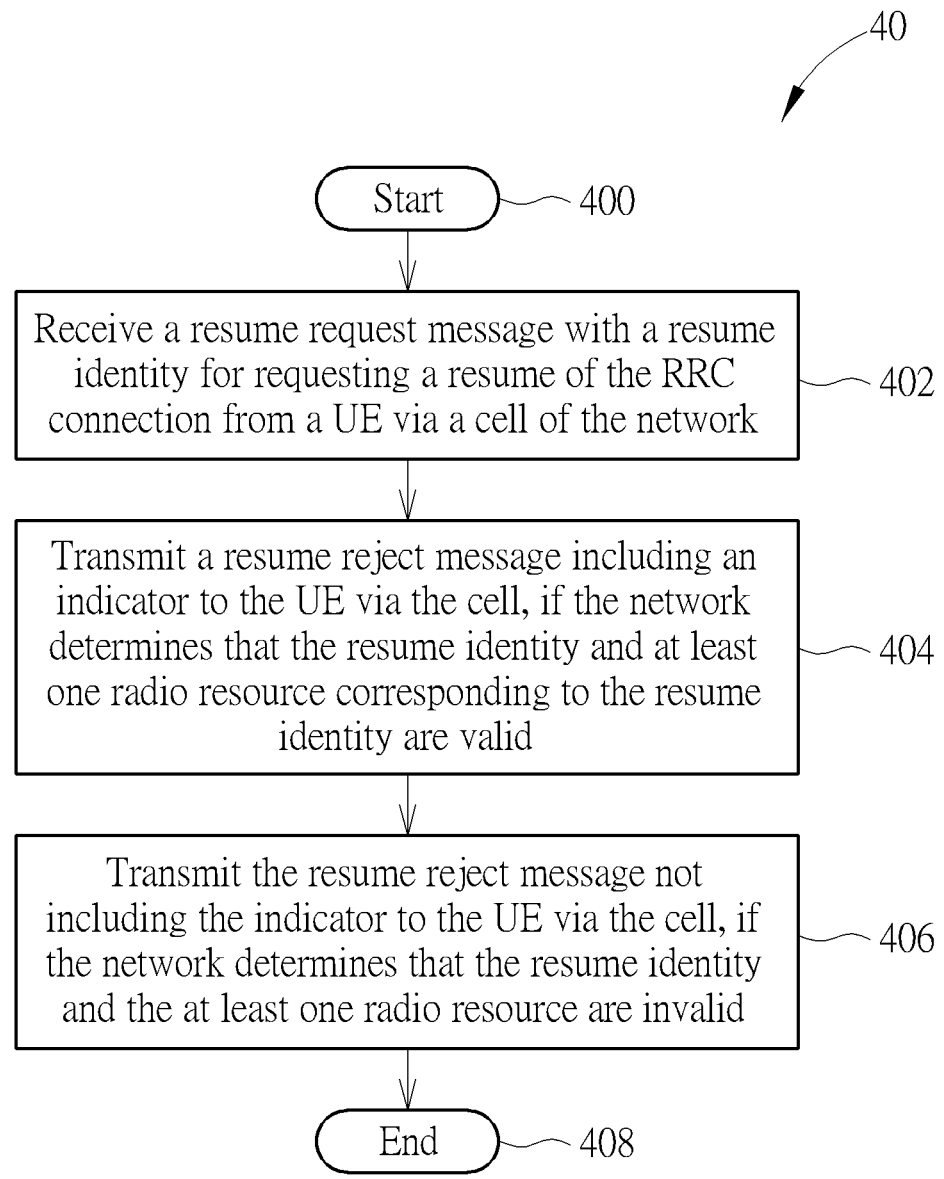
FIG. 4 is a flowchart of a process according to an example of the present invention.

FIG. 4 is a flowchart of a process 40 according to an example of the present invention. The process 40 may be utilized in a network for handling a RRC connection. The process 40 may be compiled into the program code 214, and includes the following steps:

Step 400: Start.

Step 402: Receive a resume request message with a resume identity for requesting a resume of the RRC connection from a UE via a cell of the network.

Step 404: Transmit a resume reject message including an indicator to the UE via the cell, if the network determines that the resume identity and at least one radio resource corresponding to the resume identity are valid.

Step 406: Transmit the resume reject message not including the indicator to the UE via the cell, if the network determines that the resume identity and the at least one radio resource are invalid.

Step 408: End.

According to the process 40, the network may receive a resume request message with a resume identity for requesting a resume of the RRC connection from a UE via a cell of the network. Then, the network may transmit a resume reject message including an indicator to the UE via the cell, if the network determines that the resume identity and at least one radio resource corresponding to the resume identity are valid. The network may transmit the resume reject message not including the indicator to the UE via the cell, if the network determines that the resume identity and the at least one radio resource are invalid. That is, the network may determine whether the resume reject message includes the indicator, according to whether the resume identity and the at least one radio resource are invalid. The at least one radio resource can be efficiently used according to the indicator. Thus, the problem of performing the RRC connection is solved according to the process 40.

Realization of the process 40 is not limited to the above description. The following examples may be applied to the process 40.

In one example, the network may determine that the resume identity and the at least one radio resource are valid according to a network congestion (e.g., a network congestion level). In one example, the network may determine that the resume identity and the at least one radio resource are invalid, if the resume identity is invalid or a security check of the resume request message is failed.

In one example, the resume request message may include a RRCConnectionRequest message, a RRCConnection- ReestablishmentRequest message, a RRCConnectionResumeRequest message, or a new message (e.g., a RRCResumeRequest message) for requesting the resume of the RRC connection. In one example, the resume reject message may include a RRCConnectionReject message, a RRCConnectionSetup message, a RRCConnectionReestablishmentReject message, a RRCConnectionReestablishment message, or a new message (e.g., a RRCResumeReject message) for rejecting the resume of the RRC connection.

In one example, the indicator may include redirection information. Further, the redirection information may include at least one of frequency information and a physical cell identity. In one example, the indicator may include a timer with a timer value. In one example, the network may determine that the indicator includes the timer, the redirection information or both according to the network congestion level, when the resume reject message includes the indicator.

Figure 5:
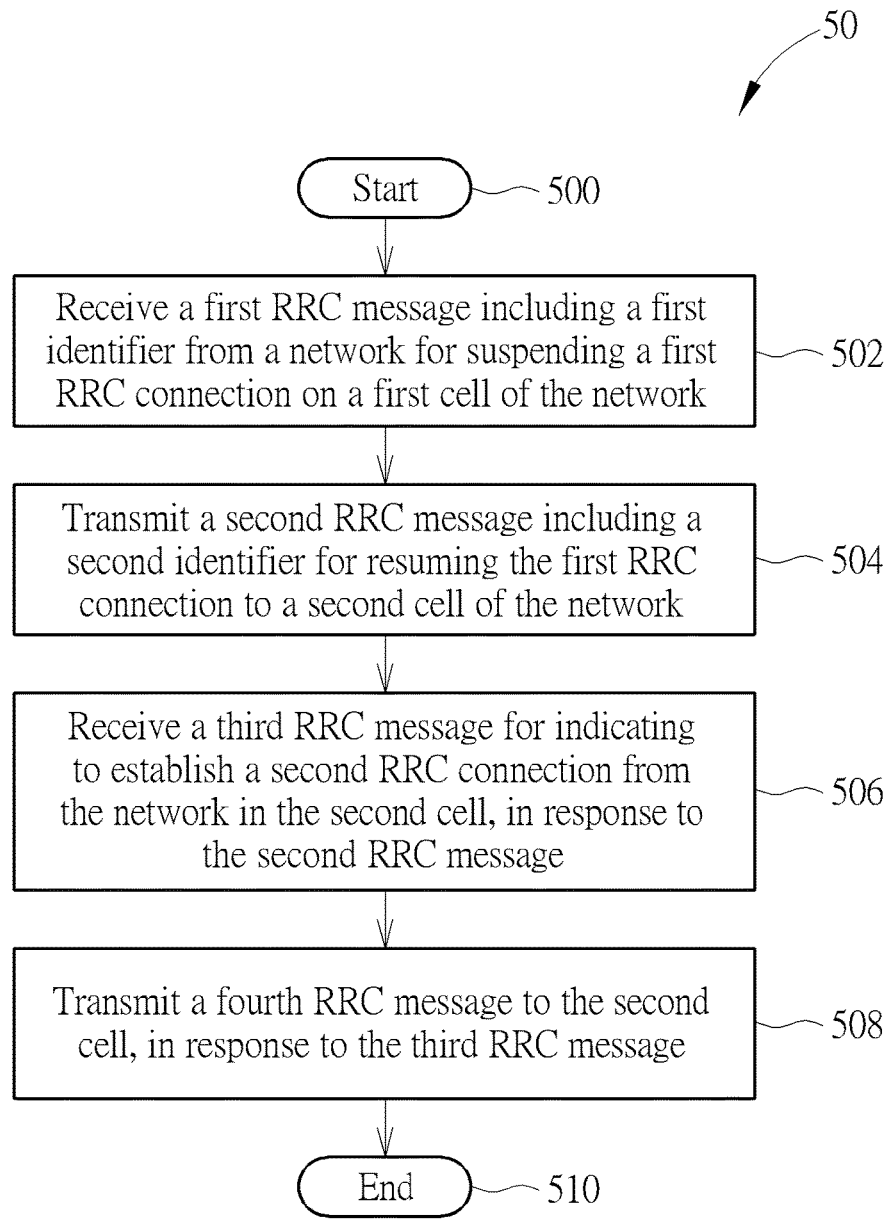
FIG. 5 is a flowchart of a process according to an example of the present invention.

FIG. 5 is a flowchart of a process 50 according to an example of the present invention. The process 50 may be utilized in a UE for handling a RRC connection. The process 50 may be compiled into the program code 214, and includes the following steps:

Step 500: Start.

Step 502: Receive a first RRC message including a first identifier from a network for suspending a first RRC connection on a first cell of the network.

Step 504: Transmit a second RRC message including a second identifier for resuming the first RRC connection to a second cell of the network.

Step 506: Receive a third RRC message for indicating to establish a second RRC connection from the network in the second cell, in response to the second RRC message.

Step 508: Transmit a fourth RRC message to the second cell, in response to the third RRC message.

Step 510: End.

According to the process 50, the UE may receive a first RRC message including a first identifier from a network for suspending a first RRC connection on a first cell of the network. Then, the UE may transmit a second RRC message including a second identifier for resuming the first RRC connection to a second cell of the network. The UE may receive a third RRC message for indicating to establish a second RRC connection in the second cell, in response to the second RRC message. The UE may transmit a fourth RRC message to the second cell, in response to the third RRC message. That is, the UE may know whether the resumption of the first RRC connection is failed and whether a RRC connection establishment is required, after receiving the third RRC message. Thus, the problem of performing the RRC connection is solved according to the process 50.

Realization of the process 50 is not limited to the above description. The following examples may be applied to the process 50.

In one example, the first RRC message may include a RRCConnectionSuspend message or a RRCConnectionRelease message. In one example, the second RRC message may include a RRCConnectionResumeRequest message. In one example, the third RRC message may include a RRCConnectionResumeComplete message or a RRCConnectionResumeReject message. Further, the third RRC message may indicate that the resumption of the first RRC connection is failed, the RRC connection establishment is required, a UE context corresponding to the second identifier is not found, or there has no resource for resuming the first RRC connection corresponding to the second identifier. In one example, the fourth RRC message may include a RRCConnectionRequest message.

In one example, the UE may fail to transmit the second RRC message due to a random access failure. In one example, the UE may fail to receive the third RRC message. That is, the UE does not receive the third RRC message after a period of time. In one example, the UE may start a timer to count the period of time when transmitting the second RRC message. Further, the period of time may be configured by the network or predetermined in the standard specification. In one example, the UE may transmit the second RRC message one or more times to the second cell during the period of time. In one example, the UE may transmit the fourth RRC message after the period of time or when the timer expires, if the reception of the third RRC message is failed.

In one example, the first identifier and the second identifier may include a resume identity transmitted by the network in the first RRC message. In one example, the first cell and the second cell may be the same cell. In one example, the UE may keep (or store) at least one of a RRC configuration (e.g., a signaling radio bearer (SRB) configuration), a dedicated radio bearer (DRB) configuration, an access stratum (AS) security context (e.g., a security key), layer 1 parameters, and layer 2 parameters, when receiving the first RRC message. In one example, the UE may release (e.g., remove or delete) at least one of the C-RNTI, the RRC configuration, the DRB configuration, the AS security context, and the layer 1 parameters, when failing to transmit the second RRC message or to receive the third RRC message.

Those skilled in the art should readily make combinations, modifications and/or alterations on the abovementioned description and examples. The abovementioned description, steps and/or processes including suggested steps can be realized by means that could be hardware, software, firmware, an electronic system, or combination thereof. An example of the means may be the communication device 20.

To sum up, the present invention provides a device and a method for handling a RRC connection. In one example, The UE determine whether the first resume identity and the at least one radio resource are valid and whether to release the first resume identity and the at least one radio resource, according to whether the resume reject message includes the indicator. The network may determine whether the resume reject message includes the indicator according to whether the resume identity and the at least one radio resource are invalid. In one example, the UE may receive a RRC message transmitted by the network to know whether the resumption of the RRC connection succeeds. As a result, the problem of performing the RRC connection is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a radio resource control (RRC) connection, comprising:
a storage unit, for storing instructions of:
transmitting a first resume request message with a first resume identity for requesting a resume of the RRC connection to a first cell of a network;
receiving a resume reject message from the first cell of the network;
determining the first resume identity and at least one radio resource corresponding to the first resume identity are valid and keeping the first resume identity and the at least one radio resource, if the resume reject message comprises an indicator; and
determining the first resume identity and the at least one radio resource are invalid and releasing the first resume identity and the at least one radio resource, if the resume reject message does not comprise the indicator; and
a processing circuit, coupled to the storage unit, configured to execute the instructions stored in the storage unit.

2. The communication device of claim 1, wherein the communication device is a narrow band internet of things (NB-IoT) communication device.

3. The communication device of claim 1, wherein the communication device is barred from accessing the first cell.

4. The communication device of claim 1, wherein the first resume request message comprises a RRCConnectionRequest message, a RRCConnectionReestablishmentRequest message, a RRCConnectionResumeRequest message, or a new message for requesting the resume of the RRC connection; and the resume reject message comprises a RRCConnectionReject message, a RRCConnectionSetup message, a RRCConnectionReestablishmentReject message, a RRCConnectionReestablishment message, or a new message for rejecting the resume of the RRC connection.

5. The communication device of claim 1, wherein the indicator comprises redirection information; and the redirection information comprises at least one of frequency information and a physical cell identity.

6. The communication device of claim 5, wherein the storage unit further stores instructions of:
selecting a second cell of the network on a first frequency of the first cell, if the redirection information does not comprise the frequency information; and
selecting the second cell on a second frequency indicated by the frequency information, if the redirection information comprises the frequency information.

7. The communication device of claim 6, wherein the storage unit further stores an instruction of:
transmitting a second resume request message with the first resume identity or with a second resume identity to the second cell.

8. The communication device of claim 1, wherein the indicator comprises a timer with a timer value.

9. The communication device of claim 8, wherein the storage unit further stores an instruction of:
starting the timer with the time value, after receiving the resume reject message which comprises the indicator.

10. The communication device of claim 9, wherein the communication device does not resume the RRC connection to the first cell, before the timer expires; or the communication device does not initiate a RRC establishment procedure, before the timer expires.

11. The communication device of claim 9, wherein the storage unit further stores an instruction of:
transmitting a third resume request message to the first cell of the network, after the timer expires.

12. The communication device of claim 11, wherein the storage unit further stores an instruction of:
transmitting the third resume request message, when selecting a third cell, before the timer expires.

13. A network for handling a radio resource control (RRC) connection, comprising:

a storage unit, for storing instructions of:
receiving a resume request message with a resume identity for requesting a resume of the RRC connection from a communication device via a cell of the network;
transmitting a resume reject message comprising an indicator to the communication device via the cell, if the network determines that the resume identity and at least one radio resource corresponding to the resume identity are valid; and
transmitting the resume reject message not comprising the indicator to the communication device via the cell, if the network determines that the resume identity and the at least one radio resource are invalid; and
a processing circuit, coupled to the storage unit, configured to execute the instructions stored in the storage unit.

14. The network of claim 13, wherein the network determines that the resume identity and the at least one radio resource are valid according to a network congestion.

15. The network of claim 13, wherein the network determines that the resume identity and the at least one radio resource are invalid, if the resume identity is invalid or a security check of the resume request message is failed.

16. The network of claim 13, wherein the resume request message comprises a RRCConnectionRequest message, a RRCConnectionReestablishmentRequest message, a RRCConnectionResumeRequest message, or a new message for requesting the resume of the RRC connection; and the resume reject message comprises a RRCConnectionReject message, a RRCConnectionSetup message, a RRCConnectionReestablishmentReject message, a RRCConnectionReestablishment message, or a new message for rejecting the resume of the RRC connection.

17. The network of claim 13, wherein the indicator comprises redirection information; and the redirection information comprises at least one of frequency information and a physical cell identity.

18. The network of claim 13, wherein the indicator comprises a timer with a timer value.

* * * * *